United States Patent
Oldani et al.

(10) Patent No.: US 8,152,173 B2
(45) Date of Patent: Apr. 10, 2012

(54) CLAMPING APPARATUS AND METHOD

(75) Inventors: Tino Oldani, Rockford, IL (US);
Giovanni Bonomi, Medinah, IL (US)

(73) Assignee: Ingersoll Machine Tools, Inc., Rockford, IL (US)

( * ) Notice: Subject to any disclaimer, the term of this patent is extended or adjusted under 35 U.S.C. 154(b) by 1286 days.

(21) Appl. No.: 11/832,932

(22) Filed: Aug. 2, 2007

(65) Prior Publication Data
US 2008/0029976 A1    Feb. 7, 2008

Related U.S. Application Data

(60) Provisional application No. 60/835,590, filed on Aug. 4, 2006.

(51) Int. Cl.
*B23B 31/16* (2006.01)
*B23B 31/30* (2006.01)

(52) U.S. Cl. ...... 279/2.09; 279/4.12; 279/110; 279/137; 82/162; 242/598.3; 242/599.3; 403/31; 403/376

(58) Field of Classification Search .............. 279/2.06, 279/2.09, 4.1, 4.12, 110, 137; 82/162; 242/598, 242/598.3, 599.3; 403/31, 373, 376; 901/30; B23B 31/16, 31/30
See application file for complete search history.

(56) References Cited

U.S. PATENT DOCUMENTS

| | | | | |
|---|---|---|---|---|
| 1,633,084 A * | 6/1927 | Flanigan | 242/598.5 |
| 2,575,062 A * | 11/1951 | Merwin | 242/129.6 |
| 3,622,094 A * | 11/1971 | Gaskins | 242/484.6 |
| 4,609,161 A * | 9/1986 | Weyand, Jr. | 242/422.4 |
| 4,688,810 A * | 8/1987 | Waite | 279/143 |
| 5,125,601 A * | 6/1992 | Monford, Jr. | 244/173.1 |
| 5,143,316 A * | 9/1992 | Goetz et al. | 242/129.5 |
| 5,261,758 A * | 11/1993 | Vranish | 403/348 |
| 5,544,837 A * | 8/1996 | Menegatto | 242/599.3 |
| 5,988,561 A * | 11/1999 | Mele | 242/599.1 |
| 6,390,169 B1 * | 5/2002 | Johnson | 156/523 |
| 8,005,570 B2 * | 8/2011 | Gloden et al. | 700/245 |
| 2005/0006521 A1 * | 1/2005 | Harvey et al. | 242/556 |
| 2008/0000576 A1 * | 1/2008 | Miller et al. | 156/166 |
| 2010/0059943 A1 * | 3/2010 | Norton et al. | 279/72 |
| 2010/0062919 A1 * | 3/2010 | Norton et al. | 483/55 |

FOREIGN PATENT DOCUMENTS

| | | |
|---|---|---|
| DE | 37 35 778 A1 | 5/1989 |
| GB | 870 004 A | 6/1961 |

OTHER PUBLICATIONS

Russell Devlieg et al., High-Speed Fiber Placement on Large Complex Structures, paper, 2007, 5 pages, 2007-01-3843.

* cited by examiner

*Primary Examiner* — Eric A Gates
(74) *Attorney, Agent, or Firm* — Reinhart Boerner Van Deuren P.C.

(57) ABSTRACT

A method and apparatus are provided, for clamping a fiber placement tool to a fiber placement machine, along a rotational axis of the fiber placement machine, through use of a clamping apparatus having a plurality of drive lugs extending axially from the machine, and having three intersecting faying surfaces thereof which mate simultaneously in substantially intimate contact with three corresponding intersecting faying surfaces of a plurality of drive lug receptacles extending axially from the tool. Pairs of movable tines, disposed on opposite sides of each drive lug, pull the drive lugs into intimate contact with the drive lug receptacles. Master fixtures are used for setting the drive lugs and lug receptacles with respect to corresponding ones of the other, to achieve a desired intimate fit between faying surfaces thereof.

13 Claims, 13 Drawing Sheets

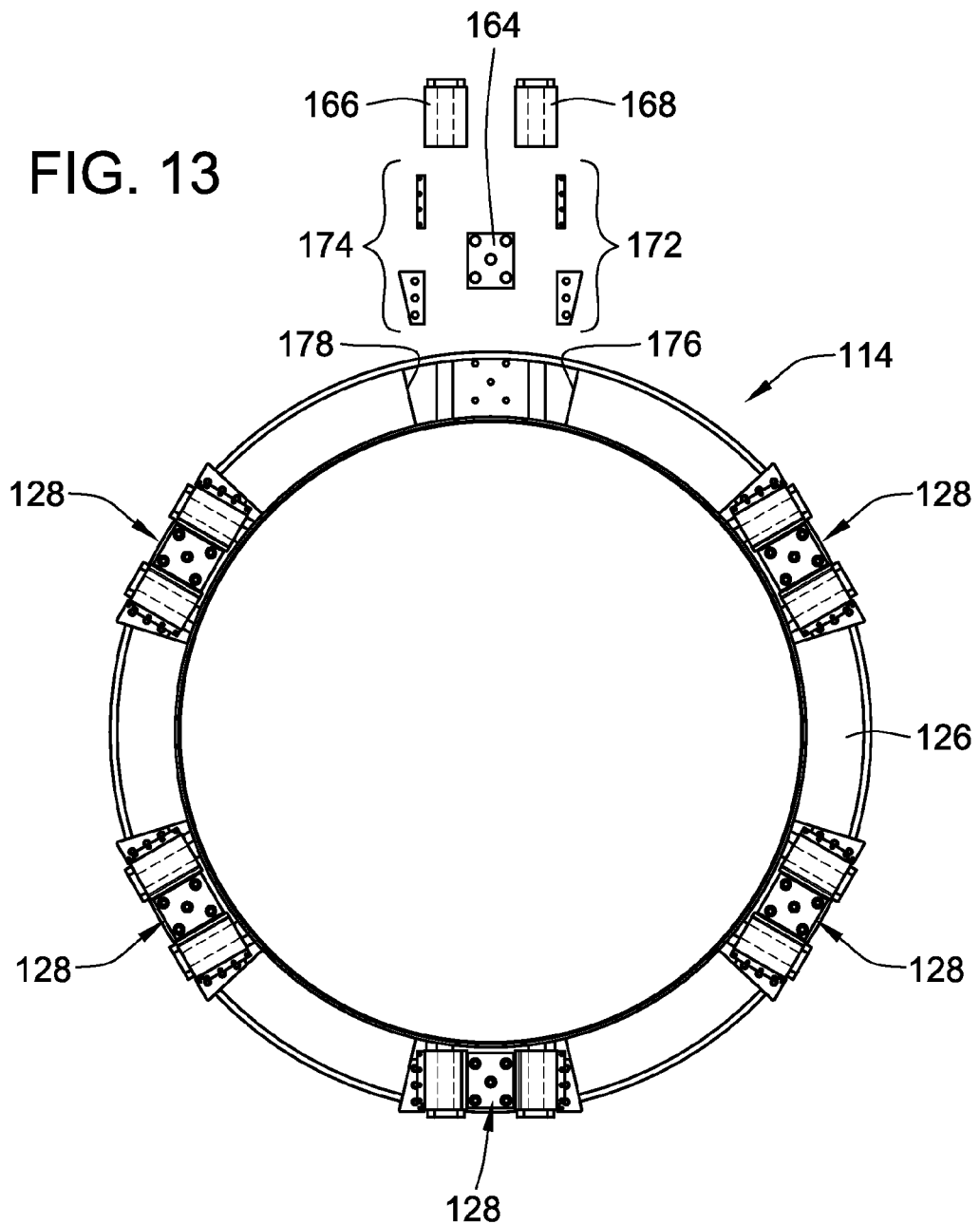

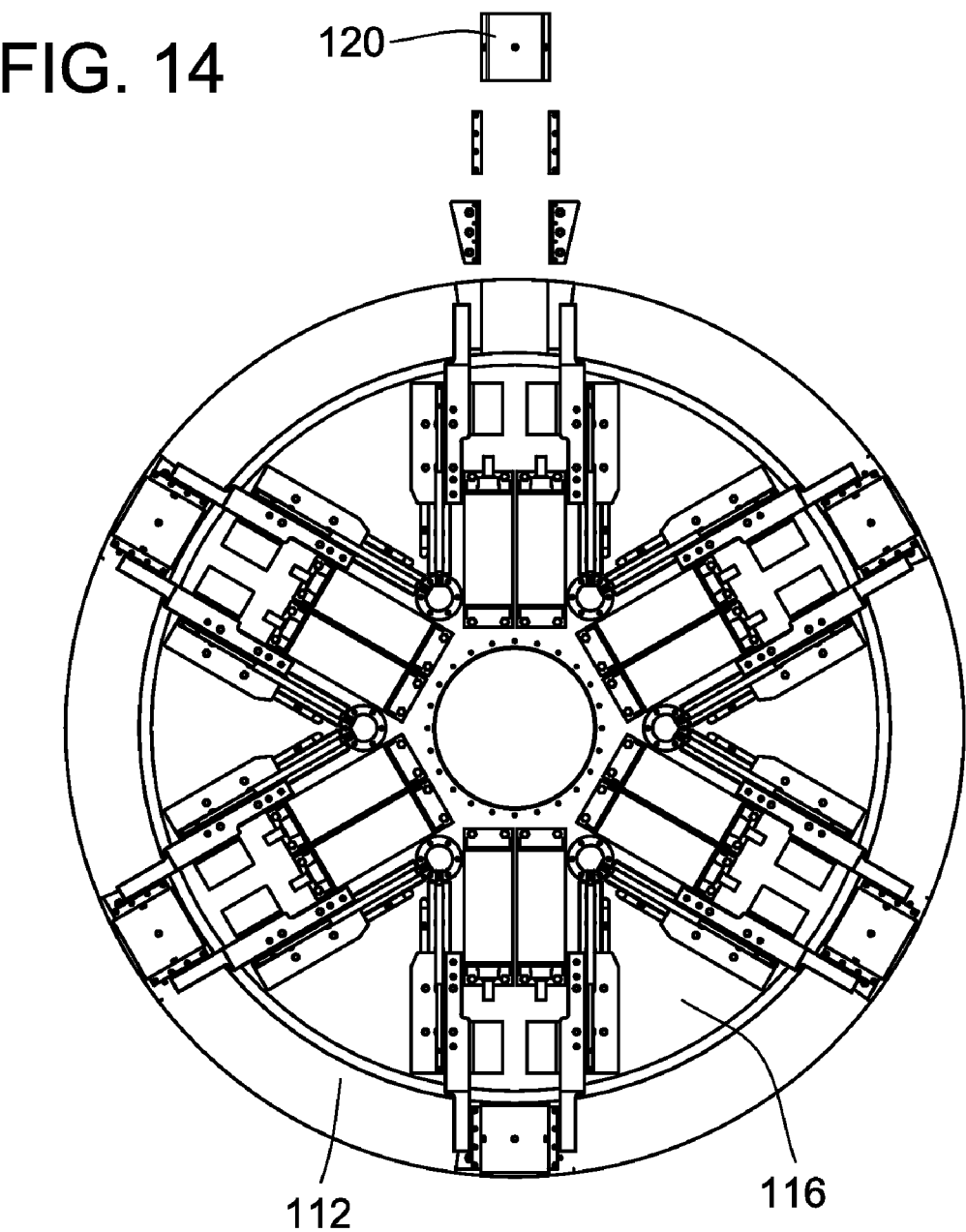

CLAMPING APPARATUS AND METHOD

CROSS-REFERENCE TO RELATED PATENT APPLICATIONS

This patent application claims the benefit of U.S. Provisional Patent Application Ser. No. 60/835,590, filed Aug. 4, 2006, the disclosure and teachings of which are incorporated herein in their entireties, by reference.

FIELD OF THE INVENTION

This invention relates to the manufacture of components from composite materials, and more particularly to a method and apparatus for attaching tools, such as rotatable mandrels, to machines, such as automated fiber placement machines, during manufacturer of components from composite materials.

BACKGROUND OF THE INVENTION

In the manufacture of composite parts, resin impregnated fiber tows and/or tapes are typically placed onto the surface of a tool, such as a rotatable mandrel. Typically the fiber tows are laid down in bands of multiple parallel tows, applied at a pre-determined angle across the tool. Multiple layers of bands, commonly known as plys, are typically successively applied, one on top of the other, to bring the part to a finished, but uncured state.

After all of the tows are laid in place onto the tool, the tool with the uncured part still resting thereupon is placed into an autoclave, or other type of curing apparatus, and additional operations are performed to cure the composite part on the tool and then remove the cured composite part from the tool.

In order for production of such composite parts to be accomplished efficiently and effectively, it is desirable to have multiple tools which are interchangeably attachable to the machine used for placing the composite material onto the tool. In this manner, while one composite part is being cured on one of the interchangeable tools, the machine utilized for placing the composite onto the tool may be simultaneously used for winding the fiber tows onto another tool. Through use of such interchangeable tools, the machine placing the fiber tows onto the tools can operate more-or-less continually, for winding successive parts, while previously wound parts are proceeding through the curing cycle and any subsequent operations required to separate the previously wound and cured parts from their respective tools. Because the machines utilized for placing the fiber tows onto the tool are often highly complex, computer controlled and generally quite expensive, the ability to have interchangeable tools, so that the machine can be run essentially continually is highly desirable.

In new generations of aircraft, however, very large parts, such as complete fuselage sections and wing skins, for example, will be constructed from composite materials through the process of automated fiber placement onto large rotatable mandrels, or other tools, by highly sophisticated automated fiber placement machines. Such parts must be manufactured with all fiber tows placed to a very high level of accuracy and precision. Given the very large size of these parts, designers have heretofore encountered considerable difficulty in developing detachable connectors for use at the interface between the tool and the automated fiber placement machine which are capable of meeting the high level of accuracy and precision in attachment of the components to one another, while simultaneously providing for convenient and practical interchangeability of tools.

It is highly desirable, therefore, to provide an improved method and apparatus for joining a fiber placement tool to a fiber placement machine, in a manner providing the required degrees of accuracy and precision in location of the tool, while simultaneously providing for convenient interchangeability of multiple tools on a single fiber placement machine, and/or use of multiple tools on multiple fiber placement machines.

BRIEF SUMMARY OF THE INVENTION

An improved method and apparatus are provided, for clamping a fiber placement tool to a fiber placement machine along a rotational axis of the fiber placement machine, through use of a plurality of drive lugs extending axially from the machine, and having three intersecting faying surfaces thereof which mate simultaneously in substantially intimate contact with three corresponding intersecting faying surfaces of a plurality of drive lug receptacles extending axially from the tool. Master fixtures may be used for setting the drive lugs and drive lug receptacles with respect to corresponding ones of the other, to achieve a desired degree of intimate fit between the corresponding faying surfaces of the drive lugs and drive lug receptacles.

A pair of movable tines may be operatively disposed on opposite sides of each of the drive lugs for selective movement outward from the axis of rotation along the sides of each drive lug to a latched position of the tines, and inward from the axis of rotation along the sides of the drive lugs to an unlatched position of the tines. The end of each tine may have a substantially axially facing inwardly angled faying surface thereof which mates with a pair of tine receptacles fixedly attached to the tool on opposite sides of each drive lug receptacle, for receiving therein one of the tines in each tine receptacle, when the tines are disposed in the latched position. The tine receptacles may each have a faying surface angled oppositely to the angled faying surfaces of the tines, whereby as the tines move outward, the complementary faying surfaces of the tines and the tine receptacles slidingly engage one another and pull the three faying surfaces of the drive lugs into substantially simultaneous intimate contact with the three faying surfaces of the drive lug receptacles.

One form of a clamping apparatus, according to the invention, for joining a fiber placement tool to a fiber placement machine along a rotational axis of the fiber placement machine, includes a male and a female connector adapted for selective detachable mating with one another along the axis of rotation. The male connector may include a base thereof adapted for rotatable attachment to the fiber placement machine, for rotation of the base about the rotational axis, and including a plurality of circumferentially spaced male drive lugs extending axially from the male connector base.

Each drive lug of the male connector may terminate in an axially facing, substantially flat surface at a distal end of the drive lug. Each drive lug may also have oppositely angled, outwardly converging, drive lug sidewalls which are truncated by the flat end wall at the distal end of the drive lug. The drive lug sidewalls may converge in such a manner that, if they were extended beyond the distal end of the drive lug, they would intersect along a substantially radially directed line extending orthogonally through the rotational axis.

The female connector may include a base thereof, adapted for rotational attachment to the tool, for rotation about the rotational axis. The female connector may also include a plurality of axially opening lug receptacles attached to the female connector base in a substantially circumferentially spaced pattern, for receiving the drive lugs in corresponding receptacles, when the male and female connectors are engaging one another. Each lug receptacle of the female connector may include an axially facing, substantially flat, bottom surface thereof, adapted for engaging the flat surface at the distal end of one of the drive lugs. Each drive lug receptacle may also have oppositely angled, outwardly diverging, lug receptacle sidewalls which are truncated by the flat bottom wall of the receptacle. The lug receptacle sidewalls form complementary faying surfaces for mating with the drive lug sidewalls, in substantially intimate contact therewith, simultaneously with the end surfaces of the lugs mating in substantially intimate contact with the bottom walls of the lug receptacles.

The male connector further includes a pair of movable tines which are operatively attached to the base of the male connector on opposite sides of each of the drive lugs, for selective movement outward from the axis of rotation along the sides of each drive lug to a latched position of the tines, and inward toward the axis of rotation along the sides of the drive lugs, to an un-latched position of the tines. The end of each tine may include a substantially axially facing, inwardly angled, faying surface thereof.

The female connector may further include a pair of tine receptacles, fixedly attached to the base of the female connector on opposite sides of each of the drive lug receptacles, for receiving therein one of the tines of the male connector in each tine receptacle, when the tines are disposed in the latched position. The tine receptacles each have a top, substantially flat surface thereof, angled oppositely to the angled surface of the tines, whereby, as the tines of the male connector move outward from the complementary faying surfaces of the tines and the tine receptacles slidingly engage one another and pull the distal ends of the drive lugs into substantially intimate contact with the top surfaces of the drive lug receptacles while also simultaneously pulling the drive lugs side surfaces into substantially intimate contact with the lug receptacle sidewalls.

In a male connector, according to the invention, a separate tine drive apparatus may be provided for each tine, with the separate drive apparatus being operatively connected between the base and its respective tine, for driving the tine between the latched and un-latched positions. The tine drive apparatus may include a sliding truck device, operatively attaching the tine to the base, and a pneumatic cylinder operatively attached between the truck and the base. A pressurized gas strut device, may be operatively connected between the truck and the base, for biasing the truck and the tine attached thereto toward the latched position of the tine. A manual actuation apparatus, adapted for removable attachment to the tine, may also be provided for moving the tine between the latched and un-latched positions of the tine.

In some forms of the invention, multiple female and/or male connectors are adapted for interchangeable use with one another. The adaptations of the multiple female and/or male connectors may include the provision of adjustment features, for adjusting the relative positions of the drive lugs and corresponding drive lug receptacles in a manner allowing interchangeable use of the multiple female and/or male connectors with one another.

In some forms of the invention, a master fixture is utilized for setting the mating components of the male and/or female connectors to a desired degree of intimate fit between respective faying surfaces thereof. A plurality of tools having female connectors respectively attached thereto, may be set by a master fixture to mate with a single male connector. The drive lugs of a male connector, according to the invention, may be attached to the male connector base with adjustable shimming components.

In a female connector, according to the invention, the lug receptacle sidewalls of the lug receptacles may be defined by two separate lug receptacle side blocks, adjustably attached to the female connector base, for movement relative to one another along a chordal axis extending perpendicularly to a radial axis extending orthogonally outward from the axis of rotation. Each of the lug receptacle tine blocks may include a tine receptacle.

In some forms of the invention, the drive lugs include pressurized air passages therein, by means of which air leakage between faying surfaces of the drive lugs and lug receptacles can be measured as an indicator of tightness of fit between the faying surfaces.

The invention may be practiced in a variety of forms, including a clamping apparatus, an automated fiber placement machine including a clamping apparatus according to the invention, a tool for connection to an automated fiber placement machine with a clamping apparatus according to the invention, a master tool for positioning components of a clamping apparatus according to the invention, or in any other form of an apparatus within the scope of the invention.

The invention may also take the form of a method for constructing and/or operating an apparatus according to the invention.

Other aspects, objects and advantages of the invention will be apparent from the following detailed description of exemplary embodiments of the invention, taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 13 is a partially exploded illustration showing adjustment features of a female connector, according to the invention; and FIG. 14 is a partially exploded illustration showing adjustment features of a male connector, according to the invention.

While the invention will be described in connection with certain preferred embodiments, there is no intent to limit it to those embodiments. On the contrary, the intent is to cover all alternatives, modifications and equivalents as included within the spirit and scope of the invention.

DETAILED DESCRIPTION OF THE INVENTION

Figure 1:
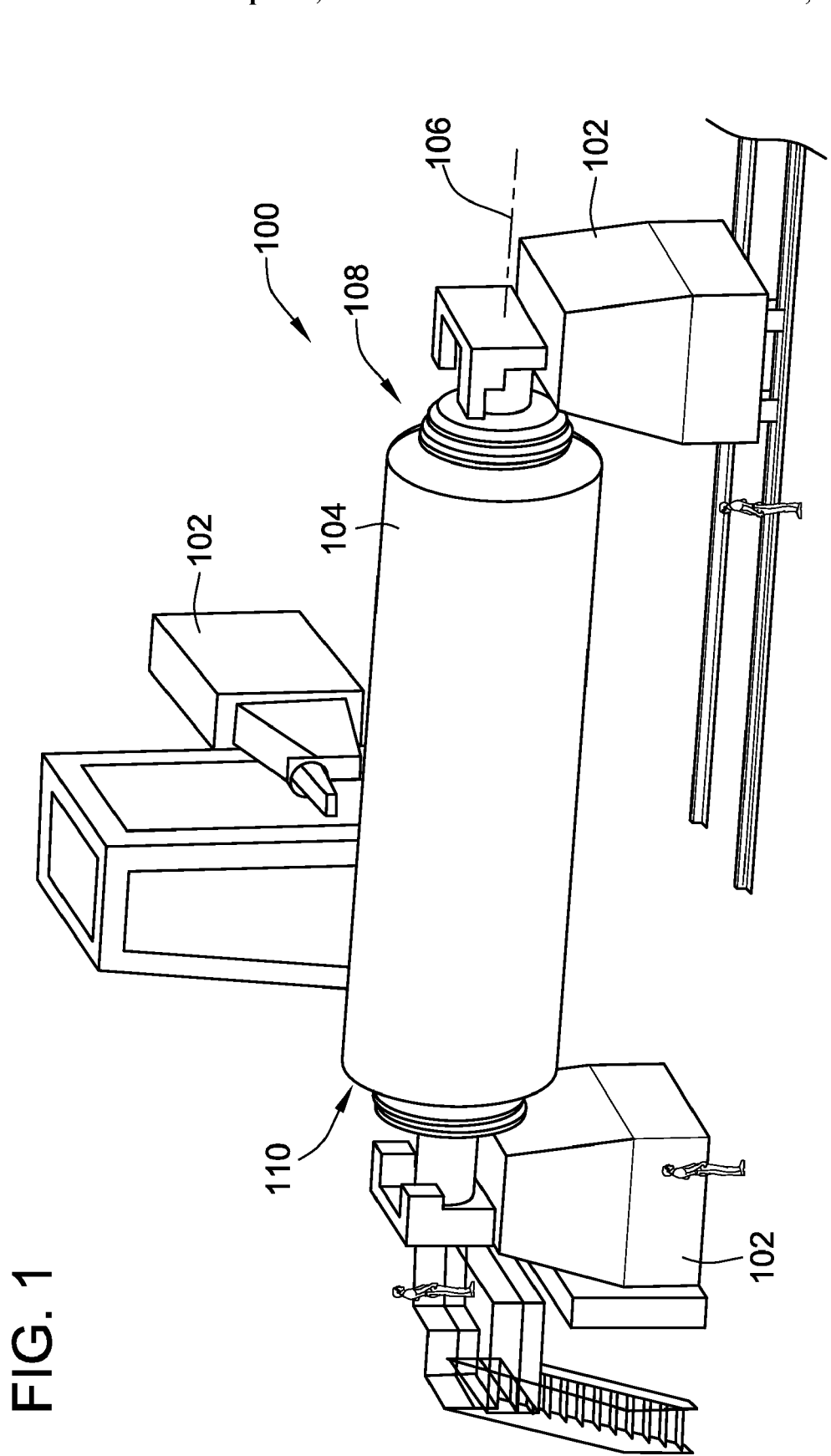
FIG. 1 is a perspective illustration of an automated fiber placement apparatus, in accordance with the invention, including a tool attached to a fiber placement machine by a pair of clamping apparatuses, according to the invention.

FIG. 1 shows a first exemplary embodiment of an automated fiber placement apparatus 100, including a tool 104 connected to and an automated fiber placement machine 102. The tool 104 is mounted for rotation about a rotational axis 106 by identical first and second clamping apparatuses 108, 110 joining opposite axial ends of the tool 104 to the fiber placement machine 102. The identical first and second clamping apparatuses 108, 110 are oriented in opposite axial directions, as shown in FIGS. 2 and 3.

As indicated by the three human figures shown in FIG. 1, the exemplary embodiment of the invention described herein is capable of forming a very large composite structure on the tool 104, such as a section of the fuselage of an airliner. Such a structure may be, for example, six meters or more in diameter and 20 meters or more in length. Such structures are typically highly complex, including a number of openings for windows and the like, and attachment points for other aircraft structures which are not illustrated in FIG. 1.

As previously stated, the first and second clamping apparatuses 108, 110, are identical, but oppositely facing along the rotational axis 106. Each of the first and second clamping apparatuses 108, 110 includes a male connector 112 and a female connector 114, with the male and female connectors 112, 114 being adapted for selective detachable mating with one another along the axis of rotation 106.

Figure 2:
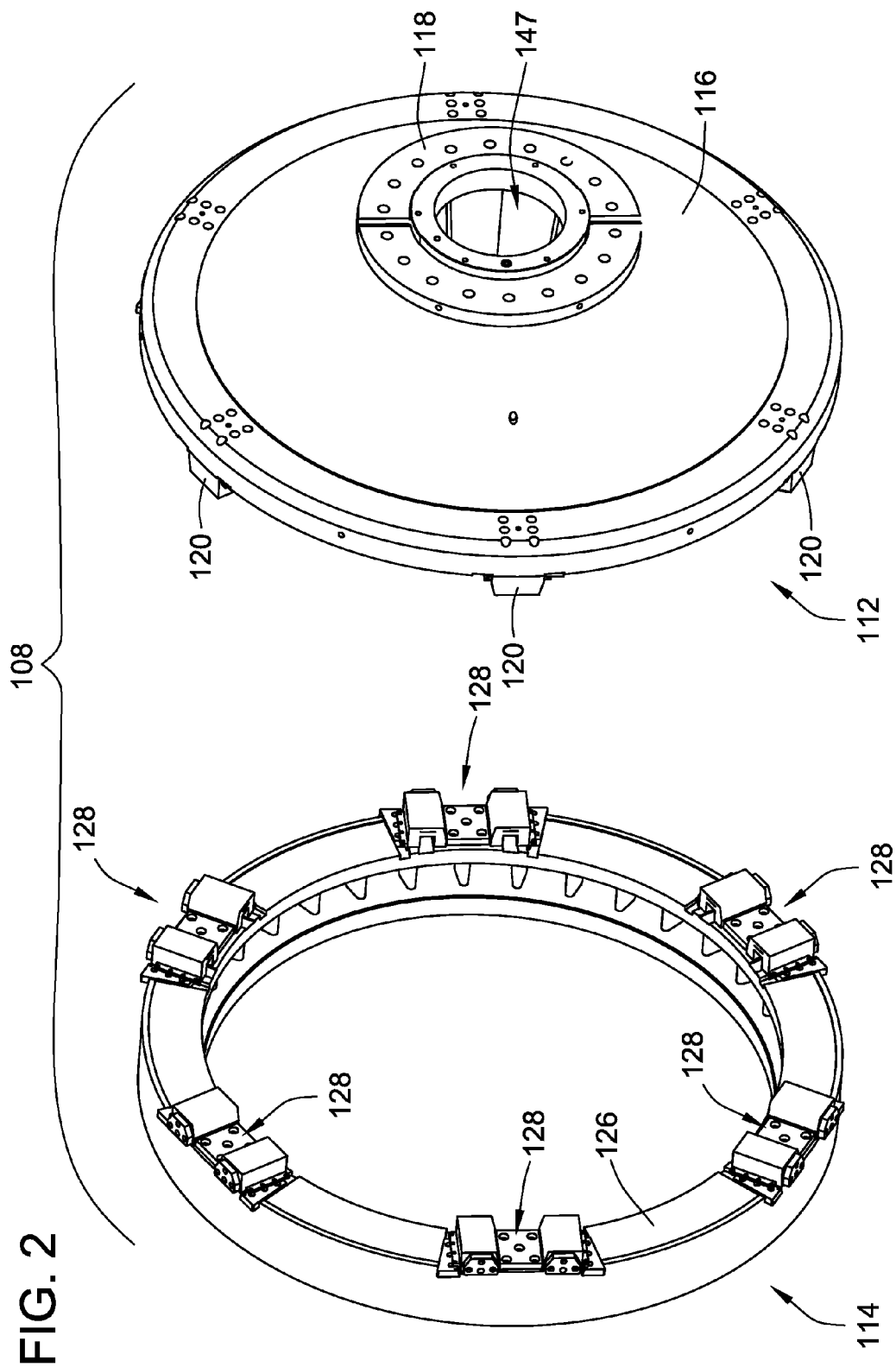
FIGS. 2 and 3 are perspective exploded illustrations of a first and second clamping apparatus, according to the invention, of the exemplary embodiment of the automated fiber placement machine shown in FIG. 1.
Figure 3:
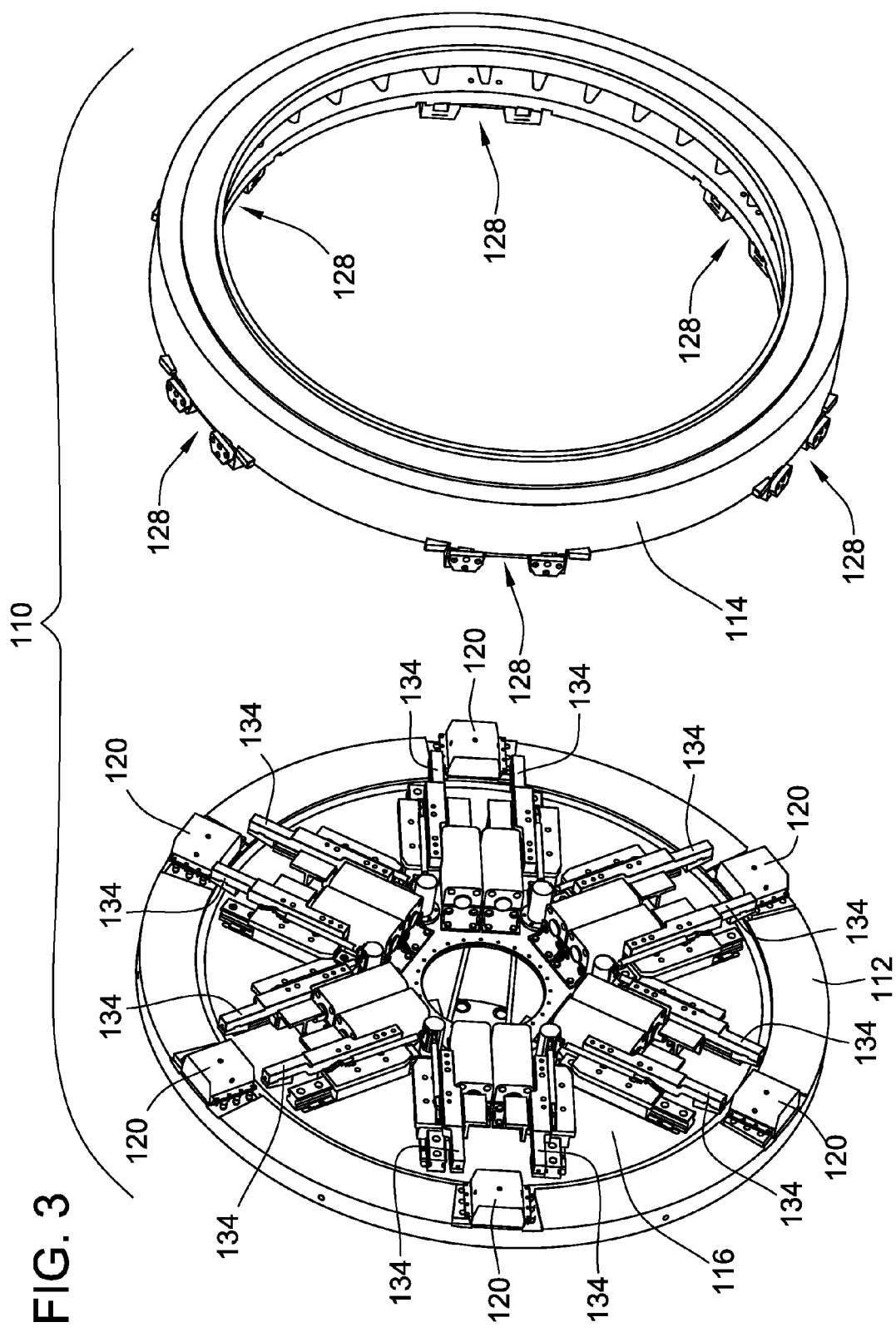

As best seen in FIG. 3, the male connectors 112 include a base 116 thereof, adapted for rotatable attachment to the fiber placement machine 102, by means of a hub 118, as shown in FIG. 2, for rotation of the base 116 about the rotational axis 106.

As shown in FIGS. 2 and 3, the male connectors also include a plurality of circumferentially spaced male drive lugs 120 extending axially from the male connector base 116 toward the female connector 114.

Figure 4:
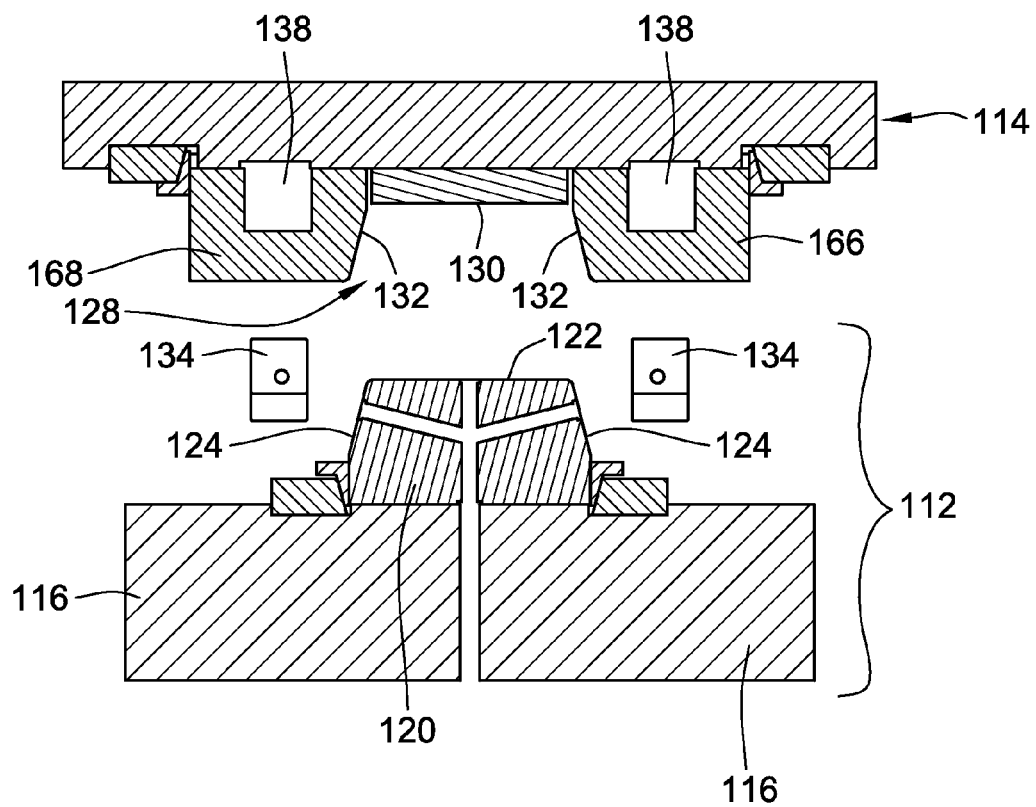
FIG. 4 is a cross-sectional illustration, showing various elements of the clamping apparatuses, of the exemplary embodiment, including one of a plurality of drive lugs and its mating lug receptacle.

As best seen in FIG. 4, each drive lug 120 of the male connector 112 terminates in an axially facing, substantially flat distal end surface 122 thereof. Each drive lug 120 also has oppositely angled, outwardly converging drive lug sidewalls 124, which are truncated by the flat distal end wall 122 of the drive lug 120. The drive lug sidewalls 124 converge in such a manner that, if they were extended beyond the distal end 124 of the drive lug 120, they would intersect along a substantially radially directed line extending orthogonally through the rotational axis and bisecting the drive lug 120.

Figure 5:
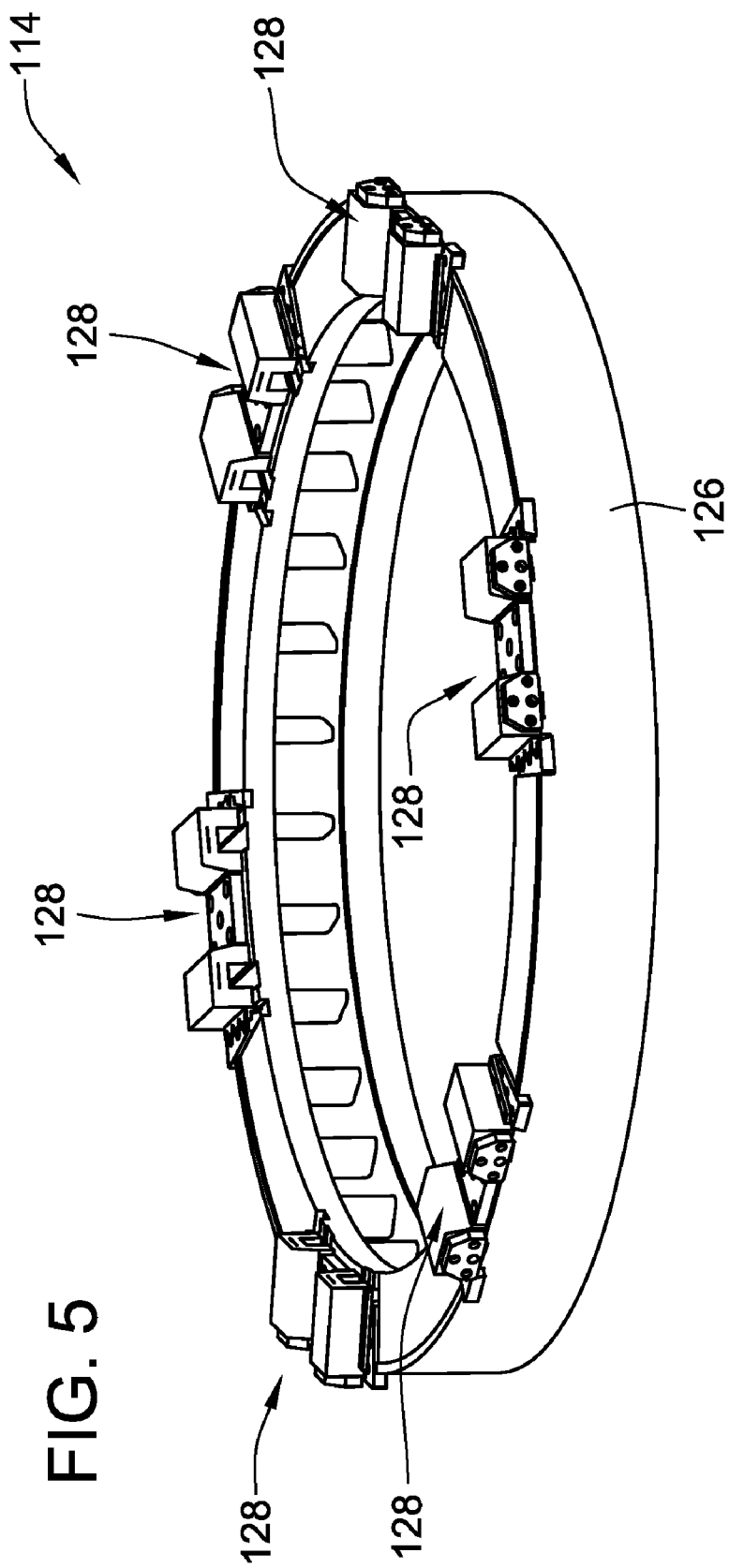
FIG. 5 is a perspective view of a female connector, of the exemplary embodiment of the clamping apparatuses shown in FIGS. 2 and 3.

As shown in FIGS. 2, 4, and 5, the female connectors 114 include a base 126 thereof, adapted for rotatable attachment to the tool 104, for rotation about the rotational axis 106. The female connectors 114 include a plurality of axially opening lug receptacles 128 attached to the female connector base 126 in a substantially circumferentially spaced pattern, for receiving the drive lugs 120 and corresponding receptacles 128 when the male and female connectors 112, 114 are engaging one another.

As shown in FIG. 4, in the exemplary embodiment of the invention, the lug receptacles 128 are actually formed from three separate pieces which will be described in greater detail below. The three separate pieces of each lug receptacle 128, in combination, define an axially facing, substantially flat bottom surface 130 of the lug receptacle 128 which is adapted for engaging the flat surface at the distal end 122 of a corresponding drive lug 120. Each drive lug receptacle 128 also has oppositely angled, outwardly diverging lug receptacle sidewalls 132, which are truncated by the flat bottom wall 130 of the receptacle 120. The lug receptacle sidewalls 132 form complementary faying surfaces for mating with the drive lug sidewalls 124 in substantially intimate contact therewith, simultaneously with the end surfaces of the lugs 120 mating in substantially intimate contact with the bottom walls 130 of the lug receptacles 128.

Figure 6:
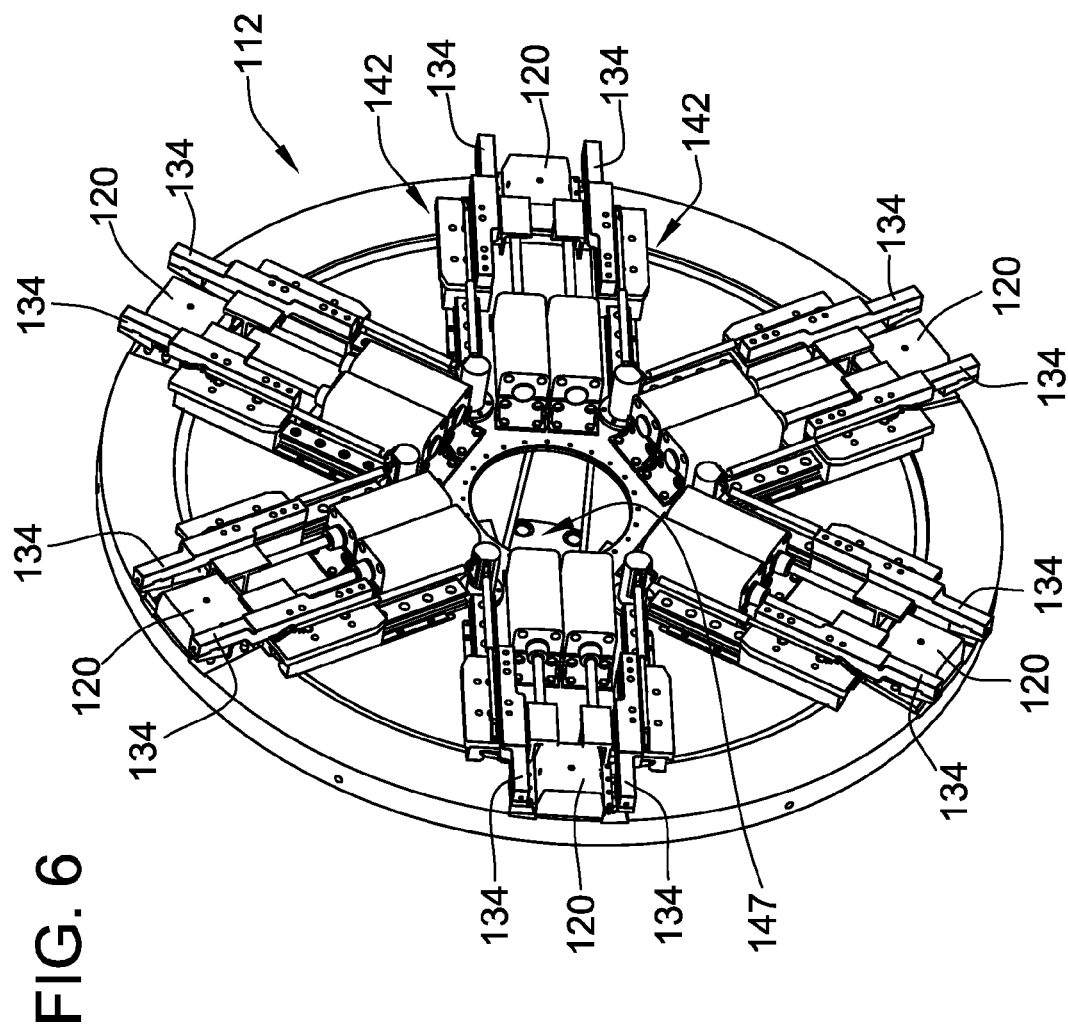
FIG. 6 is a perspective illustration of a male connector, of the exemplary embodiment of the clamping apparatuses shown in FIGS. 2 and 3, with the male connector shown in a latched position.

As shown in FIGS. 3 and 6, the male connectors 112 further include pairs of movable tines 134, which are operatively attached to the base 116 of the male connector 112, on opposite sides of each of the drive lugs 120, in a manner described in greater detail below, for selective movement of the tines 134 outward from the axis of rotation 106 along the sides of each drive lug 120 to a latched position of the tines 134, as indicated in FIG. 6, and inward toward the axis of rotation 106 along the sides of the drive lugs 120 to an un-latched position of the tines 134, as shown in FIG. 3.

Figure 7:
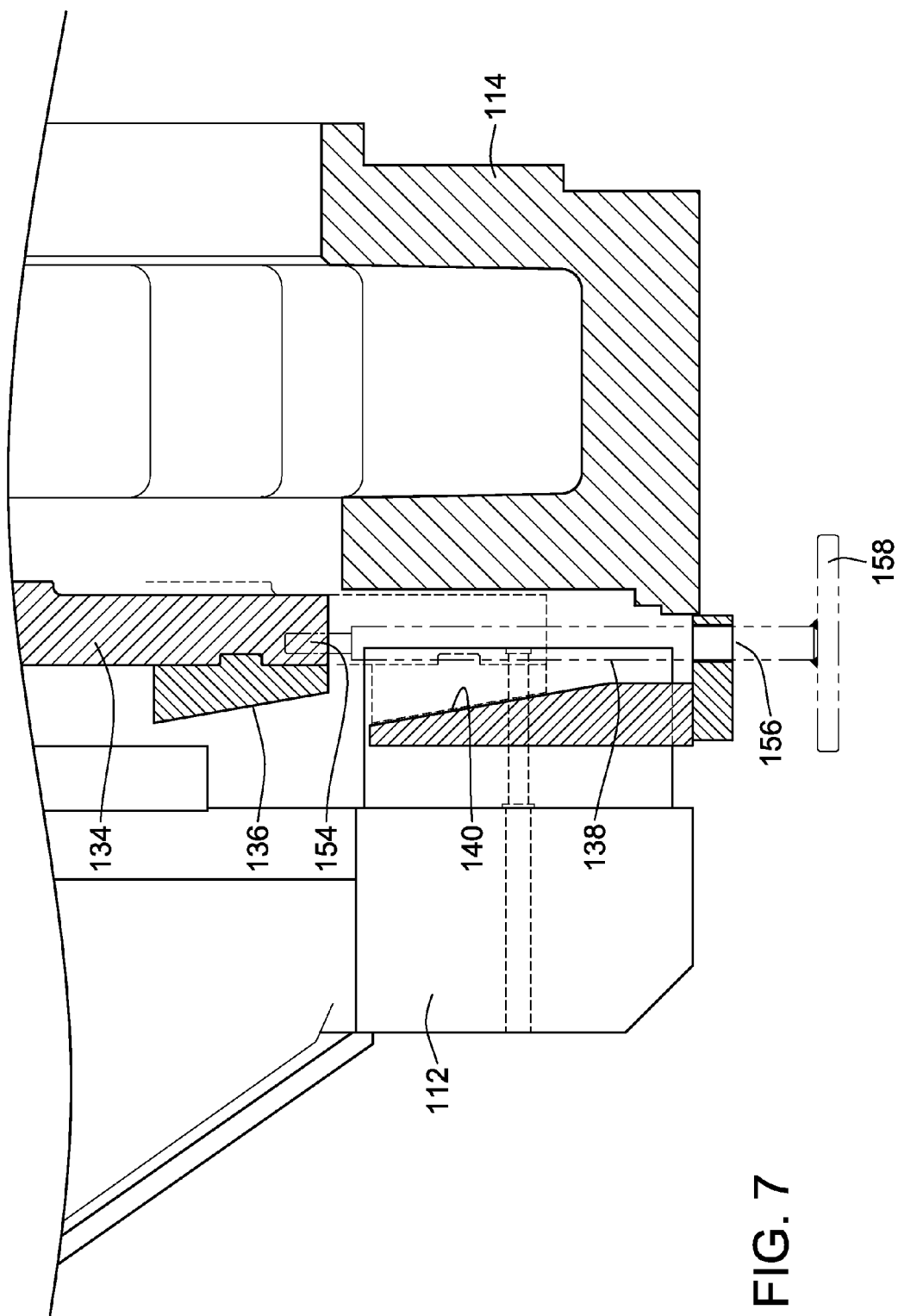
FIGS. 7 and 8 are enlarged orthographic cross-sectional views, showing a tine of a male connector engaging a tine receptacle of a female connector, in the exemplary embodiment of the clamping apparatus shown in FIG. 1 and FIG. 2, with FIG. 7 illustrating the tine disengaged from the tine receptacle, and FIG. 8 showing the tine engaging the tine receptacle.
Figure 8:
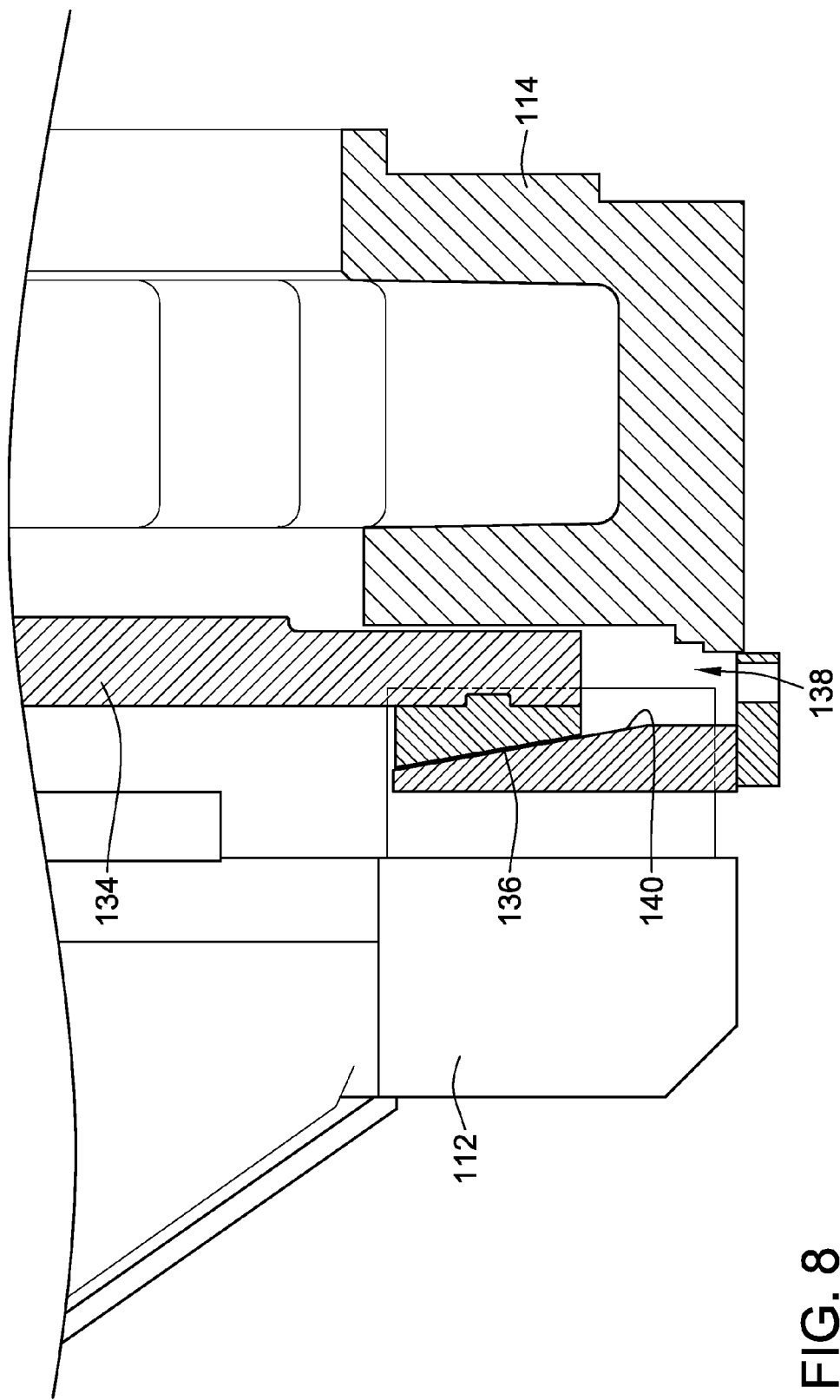

As shown in FIGS. 7 and 8, the distal end of each tine 134 includes a substantially axially facing, inwardly angled faying surface 136 thereof.

Figure 9:
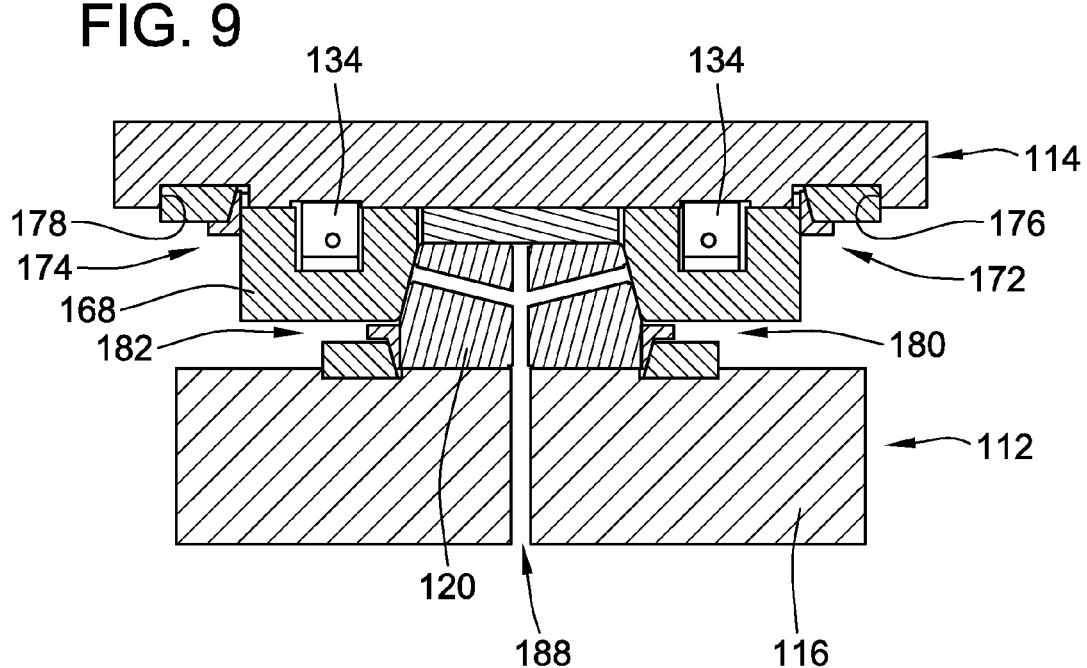
FIG. 9 is a cross-sectional view showing one of a plurality of drive lugs of a male connector, according to the invention, engaging a lug receptacle of a female connector, according to the invention.
Figure 10:
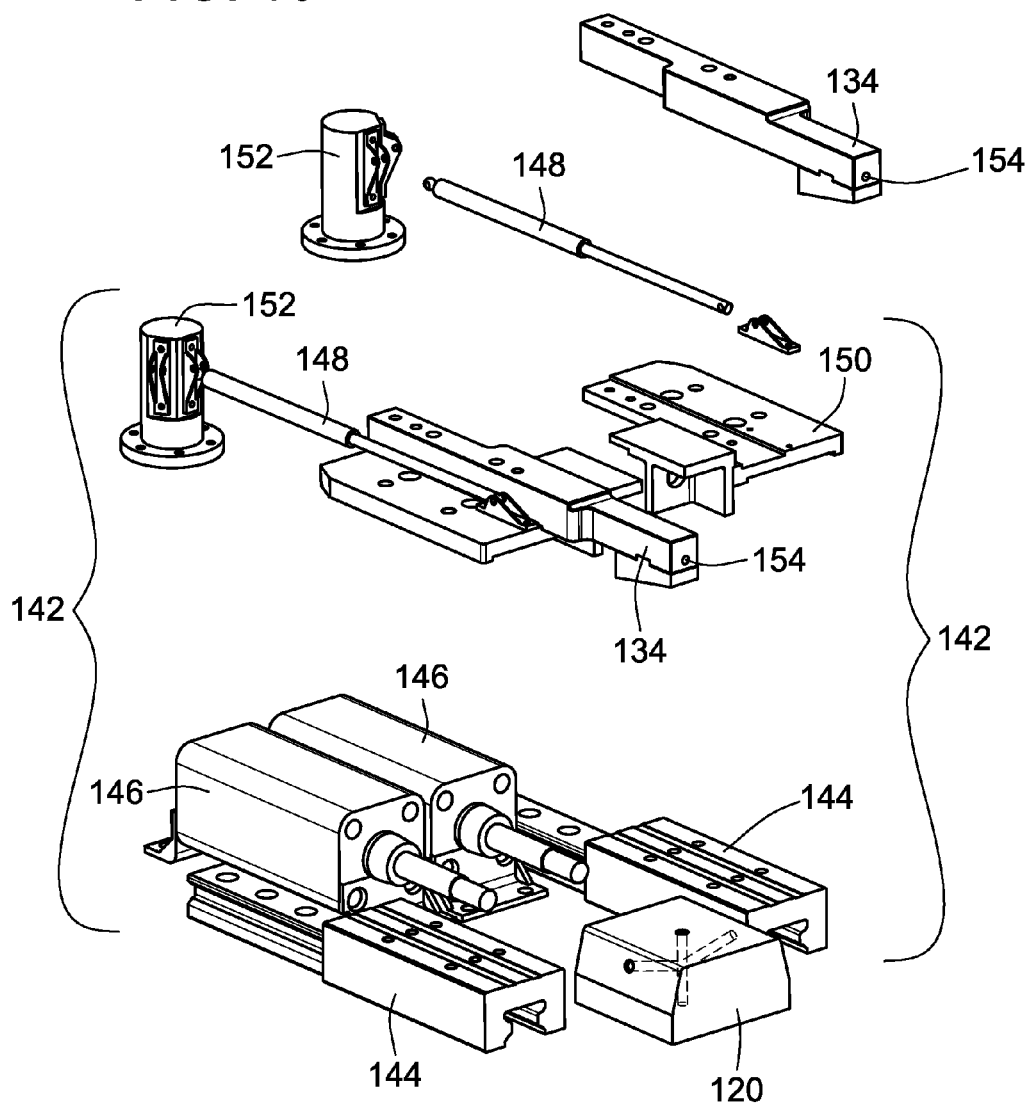
FIG. 10 is an exploded perspective illustration of a tine drive apparatus, of the exemplary embodiment of a male connector of the clamping apparatus as shown in FIGS. 1 and 2.

As shown in FIG. 4, the female connector 114 further includes a pair of tine receptacles 138, fixedly attached to the base 126 of the female connector 114 on opposite sides of each drive lug receptacle 128, for receiving therein the distal end of one of the tines 134 of the male connector 110 in each tine receptacle 138, when the male and female connectors 112, 114 are mated and the tines 134 are disposed in the latched position, as shown in FIGS. 9 and 10.

As best seen in FIGS. 7 and 8, the tine receptacles 138 each have a substantially flat top surface 140 thereof which is angled oppositely to the angled surface 136 of the distal end of the tines 134. By virtue of this arrangement, as the tines 134 of the male connector 112 move outward, the complementary faying surfaces 136, 140, of the tines 134 and the tine receptacles 138, slidingly engage one another and pull the distal ends 122 of the drive lugs 120 into substantially intimate contact with the bottom surfaces 130 of the lug receptacles 128, while also simultaneously pulling the drive lug side surfaces 124 into substantially intimate contact with the lug receptacle sidewalls 132, as illustrated in FIGS. 9 and 10.

As illustrated in FIG. 6, in the exemplary embodiment of the male connector 112 described herein, a separate drive apparatus 142 is operatively connected between each tine 134 and the base 116 of the male connector 112, for driving the tine 134 between the latched and unlatched positions. As shown in FIGS. 6 and 10, each tine drive apparatus 142, in the exemplary embodiment, includes a sliding truck device 144 which operatively attaches its respective tine 134 to the base 116, and a pneumatic cylinder 146 operatively connected between the truck 144 and the base 112, for moving the truck 144, with its respective tine 134 attached thereto, between the latched position shown in FIG. 7, and the unlatched position shown in FIG. 3. As shown in FIGS. 2 and 7, the center of the bases 116 of the male connectors 112, in the exemplary embodiment, includes a through hole for passage of air lines (not shown) from a pneumatic rotary manifold and electric slip ring device (not shown) for making a rotatable control connection between the pneumatic cylinders 146 (and/or other components mounted on the base) and non-rotating control elements (not shown) attached to the automated fiber placement machine 102.

The tine drive apparatuses 142, of the exemplary embodiment of the invention described herein, also include pressurized gas strut devices 148, operatively connected between the truck 144 and the base 116 of the male connector 112, for biasing the truck 144 and the tines 134 respectively attached thereto toward the latched position of the tines 134. Specifically, in the exemplary embodiment, the tines 134, and the pressurized gas strut 148 associated therewith are each attached to a bracket 150 which is in turn attached to its respective sliding truck device 144. The opposite ends of each of the gas struts 148 are attached to posts 152 which are in turn attached to the base 116 of the male connector 112.

Figure 11:
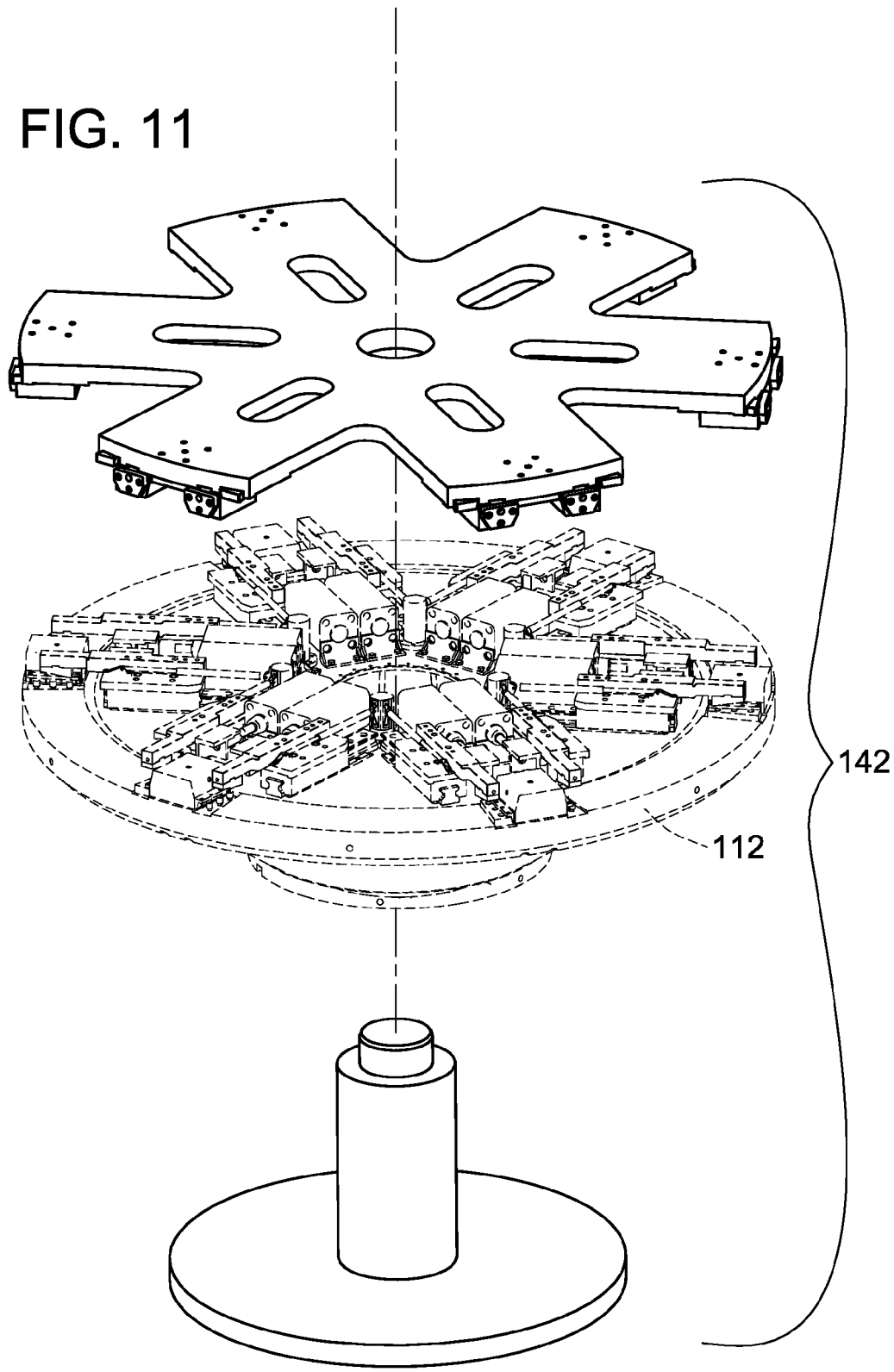
FIG. 11 is an exploded perspective illustration of the construction and use of a male connector master tool, for adjusting faying surfaces of male and female connectors of the exemplary embodiments of the clamping apparatus as shown in FIG. 1 and FIG. 2 to a common standard, to provide for interchangeability of a plurality of tools with a plurality of fiber placement machines.

As shown in FIG. 8, the exemplary embodiment of the first and second clamping apparatus 108, 110 also include a manual actuation apparatus adapted for removable attachment to each of the tines 134, for moving the tines 134 between the latched and un-latched positions of the tines 134. Specifically, as seen in FIGS. 8 and 11, each of the tines includes a threaded hole 154 in the radially outward distal end of the tine 134, and the lug receptacles 128 include an aligned hole 156 therein, for passage therethrough of a puller/driver 158, having a threaded end thereof for threadably engaging the threaded hole 154 in the end of the tine 134. The puller/driver 158 may be used for manually moving the tine 134 into engagement with the tine receptacle 138, by pulling on a handle at the outer end of the puller/driver, or conversely, may be used for pushing or driving the tine 134 out of engagement with the tine receptacle 138, should it be desirable or necessary to do so when pneumatic pressure is not available for application to the cylinders 146, or due to a failure of a component in the drive apparatus 142. In some embodiments of the invention, it may be desirable to have separate tools for pulling and driving on the distal end of the movable tines 134, so that a greater driving force can be applied than could be carried through the threaded connection shown in FIG. 8, between the threaded end of the puller/driver 158 and the threaded hole 154 in the tine 134.

Figure 12:
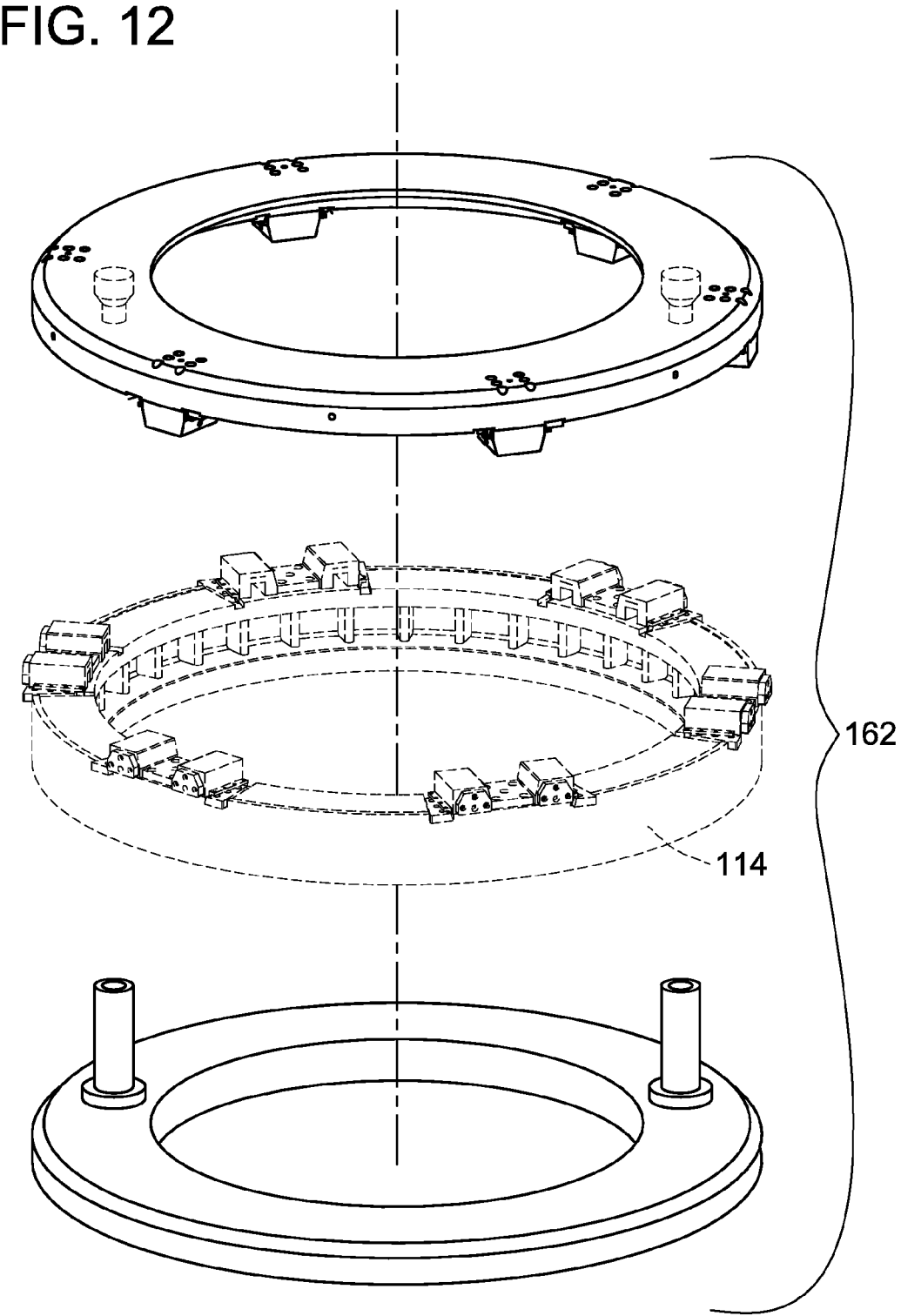
FIG. 12 is a perspective exploded illustration of the construction and use of a female connector master tool, according to the invention.

In order to ensure interchangeability of tools 104 having female connectors 114, with male connectors 112 attached to the fiber placement machine 102, in accordance with the invention, master tools 160, 162, as shown in FIGS. 11 and 12, are utilized for individually adjusting the faying surfaces between the male and female connectors, 112, 114 to a common, fixed standard of reference. Specifically, as shown in FIG. 11, a male connector master tool 160 is utilized for setting the end surface 122 and the drive lug sidewalls 124, of each of the individual drive lugs 120 of the male connector 112 to a common standard position, as defined by the male connector master tool 160 in the manner illustrated in FIG. 11. In similar fashion, as illustrated in FIG. 12, a female connector master tool 162 is utilized for setting the bottom surface 130 and the lug receptacle sidewalls 132, 132 of each of the individual lug receptacles 128 of each female connector 114 to a common, precisely controlled, standard position defined by the female connector master tool 162.

As shown in FIGS. 4 and 13, the lug receptacles 128 of the female connector 114 are actually defined by three separate pieces, in the form of a bottom plate 164 and two tine receptacle blocks 166, 168. As shown in FIG. 13, the three components 164, 166, 168, which in combination serve to define the lug receptacles 128, are attached to the base 126 of the female connector 114 within slotted regions 170 of the base 114 having multi-level mounting surfaces for mating with the bottom plate 164 and the two tine receptacle blocks 166, 168 of the lug receptacles 128. As further seen in FIG. 13, in the exemplary embodiment of the invention, the bottom plates 164 of the lug receptacles 128 are bolted to the base 126, of the female connector 114, with a series of bolts (not shown) passing through counter bores holes in the bottom plate 164. The counter bores have a depth sufficient to place the heads of the attachment bolts below the bottom surface 130 defined by the exposed surface of the bottom plates 164, within the lug receptacles 128, when the bottom plates 164 are attached to the base 126 of the female connector 114. Through-holes extending from the counter bores of the holes in the bottom plates 164 are somewhat larger in diameter than the attachment bolt diameter, so that the location of the bottom plates 164 can be shifted slightly on the base 126 if it is necessary to do so. Although not illustrated in the drawing, shims of appropriate thickness may also be clamped between the bottom plate 164 and the base 126, by the attachment bolts, to adjust the axial position of the bottom surface 130 of each of the lug receptacles 128, by moving the bottom plates 164 inward or outward with respect to the base 126, to achieve a necessary fit between the bottom surfaces 130 and a mating surface of the female connector master tool 162.

The first and second tine receptacle blocks 166, 168, of each of the lug receptacles 128 are adjustably bolted to the slotted region 170 of the base plate 126 of the female connector 114, with bolts passing through oversize counter bored holes in the tine receptacle blocks 166, 168, in the same manner as described above with regard to the bottom plates 164. To provide for precise control of lateral position, however, as shown in FIGS. 9 and 13, shim sets 172, 174, having angled components thereof, bear, in a wedging fashion, between each of the tine receptacle blocks 168 and oppositely angled end walls 176, 178 of the slotted regions 170 of the base 126. As will be understood from an examination of FIGS. 9 and 13, by movement of the angled components of the shim sets 172, 174 radially inward or outward along the angled end walls 176, 178 of the slotted region 170 in the base 126, the tine receptacle blocks 166, 168 may be precisely adjusted in or out, along a chordal line to achieve a necessary fit between the lug receptacle sidewalls 132, 132 and a corresponding surface on the female connector master tool 162.

As shown in FIGS. 9 and 14, each of the drive lugs 120 is attached to the base 116 of the male connector 112 in essentially the same fashion as described above for the various components making up the lug receptacles 128, through a system of bolts extending through oversized holes and shim sets 180, 182 disposed in slotted regions 184 of the base 116 of the male connector 112, and bearing against angled end walls 186, 188, in such a manner that the position of the end surface 122, and drive lug sidewalls 124, 124, may be precisely and accurately set with relation to corresponding surfaces of the male connector master tool 160.

As illustrated in FIG. 9, the base and drive lugs 120, of the exemplary embodiment of the invention, include aligned air passage therein which are adapted for connection to a source of pressurized air (not shown). By applying pressurized air to the passages 188, proper fit-up between the faying surfaces of the drive lugs 120 and the lug receptacles 128 may be conveniently checked. Specifically, when the components are properly positioned with respect to one another, there will be very little leakage between the faying surfaces of the drive lugs 120 and the lug receptacles 128. The ability to hold pressure applied through the passages 188, thereby provides a convenient method for determining proper fit between the drive lugs 120 and the lug receptacles 128.

When the male and female connectors 112, 114 are mated, with the tool 104 mounted on the automated fiber placement machine 102, application of pressure to the passages 188 will quickly determine whether or not each of the drive lugs 120 has been pulled into proper engagement with its respective lug receptacle 128 by action of the movable tines 134. If proper engagement has not been achieved, corrective action may be taken to achieve a proper fit, before placement of fiber onto the tool 104 begins.

Those having skill in the art will recognize that, although the invention has been described herein, in relation to certain exemplary embodiments, other embodiments are contemplated within the scope of the invention. For example, the invention may be utilized with a cantilever mounted tool, rather than having both ends of the tool connected to the fiber placement machine by a clamping apparatus, according to the invention. The invention may also be utilized with a tool oriented other than horizontally, i.e. vertically or at an angle.

The invention may also be practiced with a tine drive apparatus other than the pneumatically driven drive apparatus 142, described above, in relation to the exemplary embodiment. For example, in other embodiments of the invention, other types of powered actuation, utilizing hydraulic or electric power, for example, may be utilized for moving the tines. The invention is also not limited to use with powered actuators. In some embodiments of the invention, for example, it may be desirable to utilize a mechanical linkage for moving the tines of a clamping apparatus, according to the invention.

It is further contemplated that the invention may be utilized in applications other than automated fiber placement, such as more traditional machining or fabrication processes. The invention may also be utilized where components are formed by hand on a tool connected to a support structure by a clamping apparatus, in accordance with the invention. The invention may yet further be practiced in applications where it is not necessary for a tool to be rotatable about a rotational axis.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A clamping apparatus, for joining a fiber placement tool to a fiber placement machine along a rotational axis of the fiber placement machine, the apparatus comprising:

a male connector and a female connector, adapted for selective detachable mating with one another along the axis of rotation;

the male connector including a base thereof adapted for rotatable attachment to the fiber placement machine, for rotation of the base about the rotational axis, and a plurality of circumferentially spaced male drive lugs extending axially from the male connector base;

each drive lug of the male connector terminating in an axially facing substantially flat end surface at a distal end thereof and the end surfaces of all of the plurality of drive lugs, in combination, defining an axially facing axial engagement surface of the male connector;

each drive lug also has oppositely angled outwardly converging drive lug side walls truncated by the flat end wall at the distal end, the drive lug side walls converging in such a manner that, if extended beyond the distal end of the drive lug, they would intersect along a substantially radially directed line extending orthogonally through the rotational axis;

the female connector including a base thereof adapted for rotatable attachment to the tool, for rotation about the rotational axis, and a plurality of axially opening lug receptacles attached to the female connector base in a substantially circumferentially spaced pattern, for receiving the drive lugs in corresponding receptacles, when the male and female connectors are engaging one another;

each lug receptacle of the female connector including an axially facing, substantially flat, bottom surface thereof, adapted for engaging the flat surface at the distal end of one of the drive lugs and the flat bottom surfaces of all of the receptacles, in combination, defining an axial facing engagement surface of the female connector;

each drive lug receptacle also has oppositely angled outwardly diverging lug receptacle side walls truncated by the flat bottom wall of the receptacle, the lug receptacle side walls forming complimentary faying surfaces for mating with the drive lug side walls in substantially intimate contact therewith, simultaneously with the end surfaces of the lugs mating in substantially intimate contact with the bottom walls of the lug receptacles;

the male connector further including a pair of movable tines operatively attached to the base of the male connector on opposite sides of each of the drive lugs for selective movement outward from the axis of rotation along the sides of each drive lug to a latched position of the tines, and inward from the axis of rotation along the sides of the drive lugs to an un-latched position of the tines, with the end of each tine having a substantially axially facing inwardly angled faying surface thereof; and the female connector further including a pair of tine receptacles fixedly attached to the base of the female connector on opposite sides of each of the drive lug receptacles for receiving therein one of the tines of the male connector in each tine receptacle, when the tines are disposed in the latched position;

the tine receptacles each having a bottom substantially flat surface thereof angled oppositely to the angled surface of the tines, whereby, as the tines of the male connector move outward the complimentary faying surfaces of the tines and the tine receptacles slidingly engage one another and pull the distal ends of the drive lugs into substantially intimate contact with the bottom surfaces of the drive lug receptacles while also simultaneously pulling the drive lug side surfaces into substantially intimate contact with the lug receptacle side walls.

2. The apparatus of claim 1, wherein the male connector further comprises, a separate tine drive apparatus for each tine, operatively connected between the base and its respective tine, for driving the tine between the latched and unlatched positions.

3. The apparatus of claim 2, wherein the tine drive apparatuses comprise, a sliding truck device operatively attaching the tine to the base, and a pneumatic cylinder operatively attached between the truck and the base.

4. The apparatus of claim 2, further comprising, a gas shock device, operatively connected between the truck and the base for biasing the truck and the tine attached thereto toward the latched position of the tine.

5. The apparatus of claim 2, further comprising, a manual actuation apparatus adapted for removable attachment to the tine, for moving the tine between the latched and unlatched positions of the tine.

6. The apparatus of claim 1, further comprising multiple female and/or male connectors, adjustable for interchangeable use with one another.

7. The apparatus of claim 6, further including a master fixture for setting the mating components of the male and/or female connectors to a desired degree of intimate fit.

8. The apparatus of claim 7, further comprising, a plurality of tools having female connectors respectively attached thereto and set by master fixture to mate with a single male connector.

9. The apparatus of claim 1, wherein, the drive lugs are attached to the male connector base with adjustable shimming components.

10. The apparatus of claim 1, wherein, the lug receptacle side walls of the drive lug receptacle are defined by two separate lug receptacle side blocks, adjustably attached to the female connector base, for movement relative to one another along a chordal axis extending perpendicularly to a radial axis extending orthogonally outward from the axis of rotation.

11. The apparatus of claim 10, wherein, each of the lug receptacle tine blocks includes a tine receptacle.

12. The apparatus of claim 1, wherein, the drive lugs include pressurized air passages therein, through which air leakage between faying surfaces of the drive lugs and drive lug receptacles can be measured as an indicator of tightness of fit between the faying surfaces.

13. A clamping apparatus, for joining a fiber placement tool to a fiber placement machine along a rotational axis of the fiber placement machine, the apparatus comprising:

a male connector and a female connector, adapted for selective detachable mating with one another along the axis of rotation;

the male connector including a base thereof adapted for rotatable attachment to the fiber placement machine, for rotation of the base about the rotational axis, and a plurality of circumferentially spaced male drive lugs extending axially from the male connector base;

the female connector including a base thereof adapted for rotatable attachment to the tool, for rotation about the rotational axis, and a plurality of axially opening lug receptacles attached to the female connector base in a substantially circumferentially spaced pattern, for receiving the drive lugs in corresponding receptacles, when the male and female connectors are engaging one another;

the drive apparatus further comprising a tine arrangement for selectively operatively joining the male and female connectors;

wherein:

the tine arrangement includes, a plurality of tines operatively connected to one of the bases of the connector, and a plurality of tine receptacles operatively connected to the other of the bases of the connector;

either the tines or the receptacles being operatively mounted for selective outward movement with respect the rotational axis to engage the tines in their corresponding tine receptacles; and further comprising, a drive arrangement operatively connected between at least one of the tines and its respective base for driving the at least one of the tines outward into engagement with its corresponding tine receptacle.

* * * * *